3,232,174
FLUID MOTOR OPERATOR HAVING RELATIVELY MOVABLE WORKING MEMBERS
George G. Grimmer, Dallas, Tex., assignor to Otis Engineering Corporation, Dallas, Tex., a corporation of Delaware
Filed Oct. 8, 1962, Ser. No. 228,888
14 Claims. (Cl. 91—170)

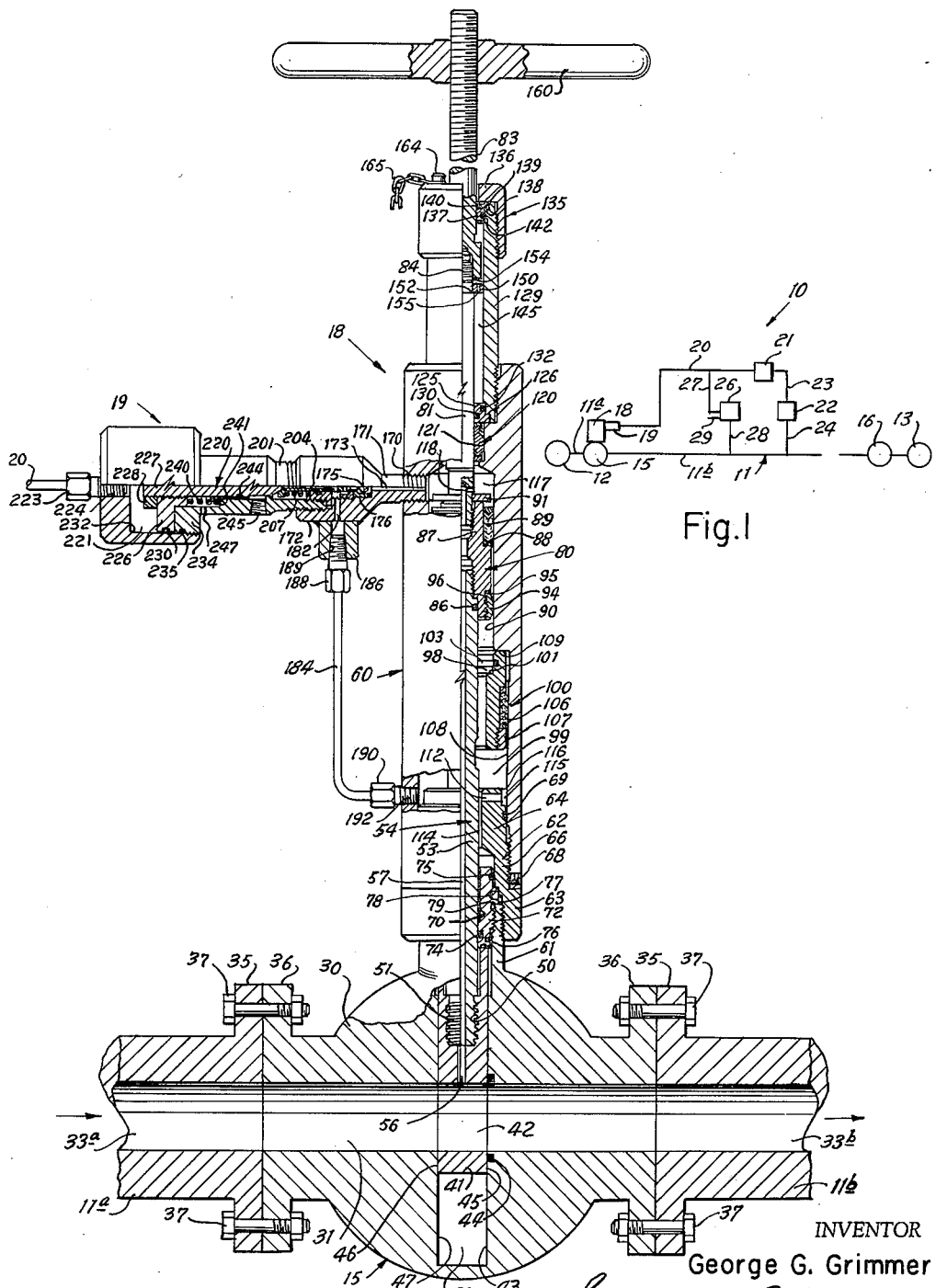

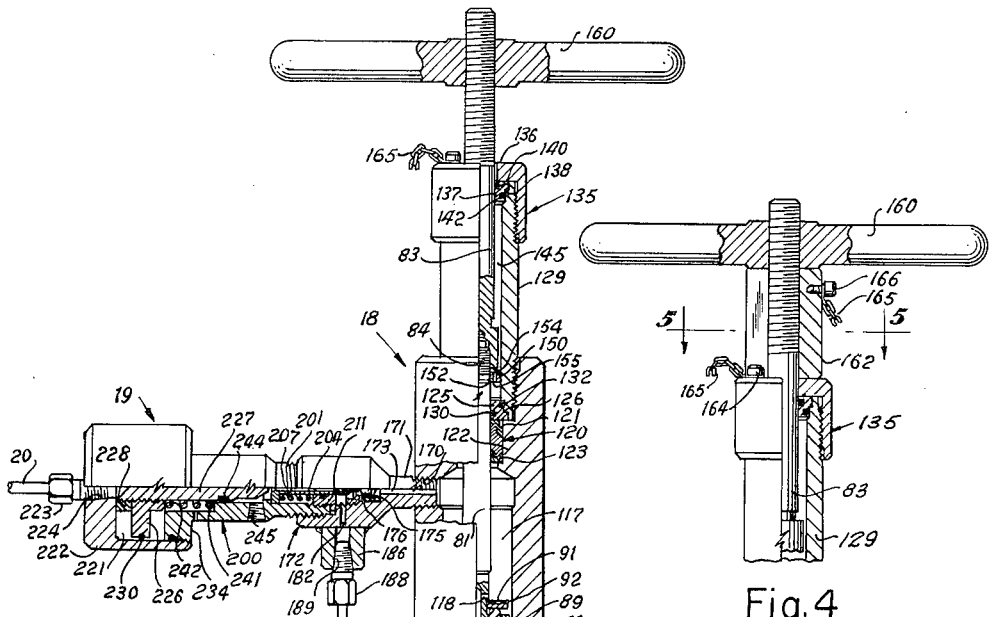
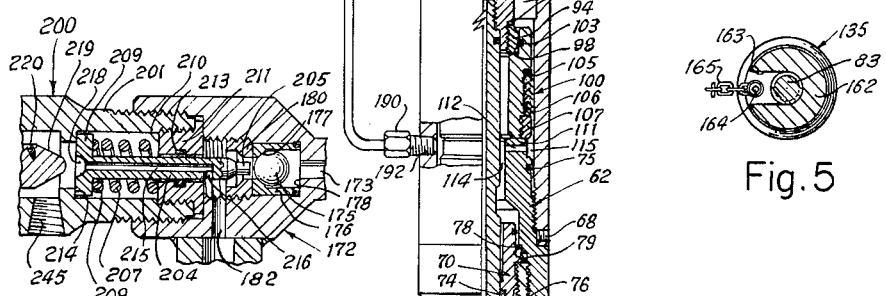
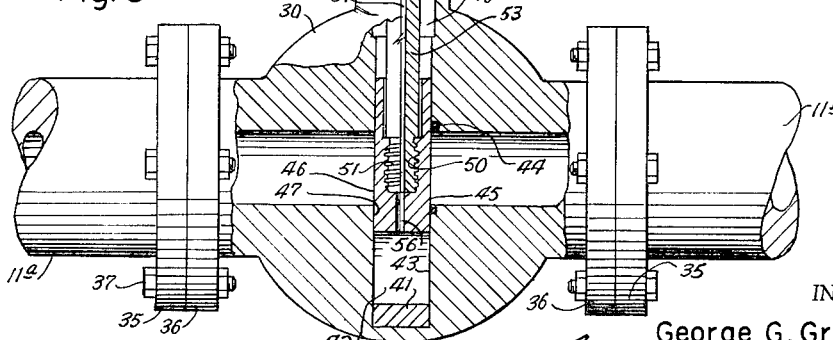
Fig. 3  Fig. 4  Fig. 5  Fig. 6
INVENTOR
George G. Grimmer
BY
ATTORNEYS United States Patent Office 3,232,174
Patented Feb. 1, 1966

This invention relates to well tools and more particularly to pressure responsive systems for controlling the flow of well fluids through flow conductors and to valve operator devices usable in such systems.

An object of this invention is to provide a new and improved pressure responsive system for automatically preventing flow of fluids through a flow conductor when the pressure within the flow conductor at a selected location therein is not within a predetermined range and which permits flow of fluids through the flow conductor when the pressure within the flow conductor is within the predetermined range.

Another object is to provide a flow control system for flow conductors, such as the pipes through which well fluids from a well are conducted to a location remote from the well, which is adapted to close the flow conductor at the well to prevent flow of well fluids from the well upon the occurrence of an abnormal pressure condition within the flow conductor.

Still another object is to provide a flow control system having a main or safety valve located adjacent the well for closing the flow conductor and an operator device for the main valve operable in response to operation of a control valve means connected in the flow conductor remote from the well for opening and closing the main valve.

A further object is to provide a flow control system which includes a main valve for closing the flow passage of the flow conductor and means responsive to the pressure within the flow passage of the flow conductor downstream of the main valve for automatically closing and opening the main valve to permit flow through the flow conductor only when predetermined pressure conditions obtain in the flow passage downstream of the flow conductor.

A still further object is to provide a flow control system wherein the conduit or flow conductor has a control valve remote from the main valve for closing the flow conductor downstream of the main valve to raise the pressure downstream of the flow conductor to an abnormal value whereby the means responsive to the pressure within the flow conductor causes the main valve to close.

Another object is to provide a flow control system wherein the means responsive to the pressure downstream of the main valve is located adjacent the main valve whereby any change in the pressure conditions within the flow conductor downstream of the valve, as might occur due to breakage of the flow conductor, will cause closure of the main valve near the point of connection of the flow conductor to the source of fluid under pressure.

Another important object of the invention is to provide an operator device for a valve which is operable by the force exerted thereon by the pressure of the fluid in a flow conductor whose flow therethrough is controlled by the valve.

Another object is to provide a valve operator device having a first surface area exposable to the pressure of the fluid whose flow is controlled by the valve for moving the valve to closed position and having a second surface area greater than the first area also exposable to the pressure of the fluid for moving the valve to open position whereby a greater force is applied to the valve to move it from closed to open position than the force applied thereto to move it from open to closed position, the frictional forces opposing movement of the operative elements of the valve being much greater when the valve is in closed position than in open position due to the large pressure differential then existing across the valve.

A further object is to provide an operator device for a safety valve having a movable gate for controlling flow of fluids through the flow passage of the valve, the operator device having means connected to the movable valve gate and having a predetermined area exposable to the pressure upstream of the valve for moving the valve gate from open to closed position and also having a floating piston cooperable with the first piston to provide a greater area exposable to the pressure upstream of the valve for moving the valve gate from closed to open position whereby the pressure of the fluid upstream of the valve exerts a predetermined force on the operator device to move the valve gate to closed position and a greater force than the closing force to move the valve gate to open position required to overcome the greater frictional force between the movable gate and the stationary elements of the valve due to the force exerted by the upstream pressure on the valve gate when the valve gate is in closed position therein.

A further object is to provide a pilot control means for selectively exposing the two areas of the operator device to the force of the pressure upstream of the valve to move the movable valve element between its closed and open positions.

Additional objects and advantages of the invention will be readily apparent from the reading of the following description of a device constructed in accordance with the invention, and reference to the accompanying drawings thereof, wherein:

FIGURE 1 is a schematic illustration of the system for controlling flow through a flow conductor embodying the invention;

FIGURE 2 is a view partly in elevation and partly in section, with some parts broken away, of the main safety valve, the operator device for the main valve and the pilot control means for controlling operation of the operator device, the main valve being shown schematically, and the operative elements of the main valve, the operator device and the pilot control means being in the positions assumed thereby when the main valve is open;

FIGURE 3 is a view similar to FIGURE 2 showing the operative elements in positions assumed thereby when the main valve is closed;

FIGURE 4 is a fragmentary partly sectional view showing a means for manually operating the operator device to open the main valve;

FIGURE 5 is a sectional view taken on line 5—5 of FIGURE 4; and

FIGURE 6 is a fragmentary sectional view of the pilot control valve.

Referring now particularly to FIGURE 1 of the drawing, the flow control system 10 embodying the invention for controlling flow of fluids through the flow conductor 11 from a source, such as the well 12, to a location remote from the source, such as the tank 13, includes a main or safety valve 15 connected in the flow conductor adjacent the well for shutting off flow through the flow conductor at the well in the event that the pressure in the flow conductor downstream of the main valve exceeds a predetermined value or decreases below a predetermined value. It is desirable that the main valve 15 be controllable from a location remote from such well if the well is in a relatively inaccessible location, such as a platform over a body of water or a swamp, so that it may be closed by such means as the control valve 16 connected in the flow conductor at such remote location in the event that the well becomes inaccessible due to storms or if access to the well is difficult even during the prevalence of good weather conditions at the well. It is also desirable that the main valve be situated adjacent the well and close to prevent flow into the flow conductor in the event of damage or breakage of the flow conductor at any location therealong in order to prevent waste of the well fluids.

The main valve 15 is operated by the operator device 18 which is controlled by a pilot control means or valve 19 responsive to the fluid pressure in the control conduit 20 which drops when the pressure in the flow conductor 11 immediately downstream of the main valve drops below a predetermined value for any reason, as for example, if the line 11 is broken at any location downstream of the main valve or if the pressure in the flow conductor rises above another higher predetermined value for any reason, such as an increase in the well pressure or a blockage of the flow conductor. The pilot valve 19 causes the operator device 18 to close the main valve and hold it in closed position when the pressure in the conduit 20 drops below a predetermined value. The control conduit 20 is connected to the main flow conductor 11 through the choke 21 or other suitable device providing a restricted orifice and a pressure regulator 22. The outlet of the pressure regulator is connected to the choke 21 by the conduit 23 and its inlet is connected to the flow conductor 11 by the conduit 24. The outlet of the choke is connected to the control conduit. The pressure regulator 22 may be of any suitable type which permits flow of fluid to the control conduit until the pressure in the control conduit rises to a predetermined value which is lower than the normal relatively high pressure in the flow conductor. An automatic control valve 26, which may be of the type illustrated and described in the patent to Dollison, No. 3,026,904, is connected to the conduit 20 by the conduit 27 and to the flow conductor 11 by the conduit 28. The automatic control valve 26 permits flow or exhaust of fluid from the control conduit 20 through the conduit 27 and the outlet 29 of the automatic control valve to the atmosphere whenever the pressure in the main flow conductor either rises above a predetermined high value or falls below a predetermined low value. The orifice of the choke 21 is substantially smaller than the orifice of the exhaust flow passage of the automatic control valve 26 in order that the pressure in the control conduit drop quickly to the value which operates the pilot valve 19 to cause the operator device 18 to close the safety valve 15 when the automatic control valve opens to exhaust the fluid from the line 20 even though more fluid continues to flow into the control conduit 20 through the choke 21. As a result, the pilot valve will cause the operator device 18 to actuate the main valve 15 and move it to closed position whenever the automatic control valve 26 permits flow of fluid from the control conduit 20 to the atmosphere.

It will be apparent that the control conduit 20 may be supplied with fluid under a predetermined low pressure from any other suitable source such as a tank or bottle of gas under pressure. The choke 21 or its equivalent is interposed between such source and the control conduit so that the flow of fluid into the control conduit from such source is at a restricted or controlled rate which is smaller than the rate of exhaust of the fluid from the control conduit through the automatic control valve.

It will be apparent that should the flow conductor 11 break, the pressure in the flow conductor 11 will drop, the automatic control valve 26 will open to permit exhaust of the fluid from the control conduit 20 and the pilot valve 19 will cause the operator device 18 to close the main valve 15. If the pressure in the flow conductor 11 rises for any reason above a predetermined high value, the automatic control valve will also open to exhaust the control conduit 20 and again cause closure of the main valve 15. The pressure in the conduit 11 may be raised above such predetermined high value by closing the control valve 16 so that by closing the control valve 16, which may be located at a great distance from the well, the main valve at the well may be closed. If, for any reason, the control conduit itself is broken, the pilot valve 19 will cause the operator device 18 to close the main valve. The control conduit may therefore be used as an additional safety device if it is disposed at exposed locations. For example, the control conduit may be disposed about the platform of an offshore well so that if the platform is rammed by a ship, the control conduit 20 will break immediately and cause closure of the main valve 15.

The operator device 18, the pilot valve 19 and the automatic control valve 26 also cooperate to move the main valve automatically to open position after it has been closed due to abnormal pressure conditions in the flow conductor 11 when the pressure conditions again are returned to normal. For example, if the control valve 16 at the remote location is opened to permit the high pressure in the flow conductor 11 to decrease into the normal range, the main valve 15 will again be opened to permit the flow of fluids from the well through the flow conductor.

Referring now particularly to FIGURES 2 through 5 of the drawing, the schematically illustrated main valve 15 may include a body 30 having a longitudinal flow passage 31 which communicates at its upstream or inlet end with the longitudinal flow passage 33a of the section 11a of the flow conductor 11 and at its downstream or outlet end with the flow passage 33b of the section 11b of the flow conductor. The sections of the flow conductor and the main valve body have the usual outwardly extending flanges 35 and 36, respectively, so that the valve body may be rigidly connected to the flow conductor sections 11a and 11b by means of the usual bolts 37 which extend through suitable aligned apertures in these flanges.

The valve body also has a transverse chamber or passage 40, which intersects its longitudinal flow passage, in which is slidably disposed a valve element or gate 41. The valve gate has an aperture or passage 42 which is in alignment and communication with the longitudinal flow passage 31 of the valve body when the valve gate is in the upper open position illustrated in FIGURE 2 to permit flow of fluid through the valve body and thus through the flow conductor 11. The valve gate is movable to the lower closed position illustrated in FIGURE 3 wherein the passage 42 of the valve gate is out of alignment and out of communication with the longitudinal flow passage of the valve body and thus prevents flow of fluid through the longitudinal flow passage of the valve body. The surface 43 of the valve body defining the downstream side of the transverse or valve gate chamber is provided with a suitable annular recess which extends about the longitudinal flow passage 31 in which is disposed an O-ring 44 or other suitable sealing means which seals between the downstream surface 45 of the valve gate and the valve body whereby the fluid pressure in the inlet or upstream portion of the longitudinal flow passage 31 of the valve body tends to move the valve gate toward the downstream side surface 43 and into sealing engagement with the O-ring 44 to prevent flow of fluids therebetween. No sealing means are provided to seal between the upstream surface 46 of the valve gate and the surface 47 of the valve body defining the upstream side of the valve gate chamber so that fluid may flow or leak between these two upstream surfaces in order to permit fluid which would otherwise be trapped in the chamber below the valve gate to flow into the chamber above the valve gate as the valve gate moves downwardly from its upper open position to its lower closed position. Conversely, fluid also may flow between these two upstream surfaces into the chamber below the valve gate and out of the chamber above the valve gate as the valve gate moves from its lower closed position to its upper open position.

The valve gate has an upwardly opening bore 50 in which is received the threaded end portion 51 of the bottom section 53 of the operator stem or rod 54 of the operator device 18. The bore 56 of the valve gate communicates the flow passage 42 thereof with the lower end of the flow passage 57 of the operator rod.

The operator rod is slidably mounted for limited longitudinal movement in the housing 60 of the operator device 18. The lower end of the housing is rigidly connected to the upward annular extension 61 of the valve body by means of a tubular adapter 62 whose lower end portion 63 of enlarged internal diameter is threaded on the upper end of the annular extension of the valve body and whose upper portion 64 of reduced external diameter telescopes into and is threadedly connected to the housing by the engagement of its threaded intermediate portion 66 with the internally threaded lower end portion of the housing. The adapter may be held against rotational movement relative to the housing by means of the set screw 68 which extends through a suitable threaded bore in the housing into engagement with the external surface of the adapter below the threaded intermediate portion 66 thereof. The adapter has an external annular recess adjacent its upper end in which is disposed an O-ring 69 or other suitable sealing means which seals between the adapter and the housing above the intermediate threaded portion of the adapter.

A tubular packing gland 70 disposed about the lower section of the operator rod 53 is threadedly secured to the annular extension of the valve body by its externally threaded intermediate portion 72. The packing gland has an internal recess in which is disposed an O-ring 74 or other suitable sealing means which seals between the lower section 53 of the operator rod and the packing gland and also has an external annular recess in which is disposed an O-ring 75 which seals between the packing gland and the adapter. The packing gland may also be provided with a lower external annular recess in which may be disposed an O-ring 76 which seals between the packing gland and the annular extension of the valve body. The packing gland has an external annular flange 77 which is disposed between and engaged by the downwardly facing annular shoulder 78 of the adapter and the upper annular end surface 79 of the annular extension of the valve body so that the adapter locks the packing gland against vertical movement.

The operator rod 54 includes a tubular piston 80 threaded on the upper end of the bottom rod section 53, an intermediate section 81 threaded in the upper end of the piston and a top section 83 threaded on the upper reduced threaded top portion 84 of the intermediate rod section. The bottom section 53 of the operator rod has an external annular recess in which is disposed an O-ring 86 which seals between the bottom rod section and the piston. The upper portion 87 of the piston is reduced externally to provide an upwardly facing annular shoulder 88 which limits downward movement of the seal assembly 89 on the piston. The seal assembly which may be of the Chevron type permits upward flow or leakage of fluids between the piston and the sealing surface 90 of the housing but prevents downward flow or leakage of fluids between the piston and the sealing surface 90. Upward movement of the seal assembly on the piston is limited by the retainer ring 91 disposed on the intermediate rod section 81. Upward movement of the retainer ring on the intermediate section of the rod is limited by its engagement with the annular downwardly facing shoulder 92 of the intermediate rod section. Downward movement of the retainer ring on the rod is limited by its engagement with the upper annular end surface of the piston. A seat ring 94 is threaded on the lower reduced end portion of the piston and a gasket 95 or other suitable sealing means is interposed below the downwardly facing annular shoulder 96 of the piston and the seat ring for sealing therebetween.

The lower end portion of the piston and the seat ring are receivable in the upwardly opening internal annular recess 98 of the auxiliary or floating piston 100 slidably disposed in the enlarged lower portion 99 of the longitudinal bore or passage of the housing 60. The lower end of the recess of the auxiliary piston is defined by the upwardly facing annular stop shoulder 101 which engages the lower annular end surface of the seat ring to limit downward movement of the piston relative to the auxiliary piston. The auxiliary piston has an internal annular recess above the stop shoulder 101 thereof in which is disposed as O-ring 103 which engages the seat ring to seal between the auxiliary piston and the seat ring, and therefore the piston 80, when the seat ring is located in the upwardly opening recess 98 of the auxiliary piston.

The reduced external lower portion of the auxiliary piston provides an annular downwardly facing shoulder 105 which limits upward movement of the seal assembly 106 disposed on the auxiliary piston. Downward movement of the seal assembly 106 on the auxiliary piston is limited by the retainer ring 107 threaded on the lower end of the auxiliary piston. The seal assembly 106 may be of the Chevron type and is so disposed that it permits downward flow or leakage of fluid between the auxiliary piston and the internal seal surface 108 of the housing but prevents upward flow of fluids therebetween. Upward movement of the auxiliary piston in the housing is limited by the engagement of its upper annular end surface with the downwardly facing annular stop shoulder 109 of the housing and its downward movement in the housing is limited by the engagement of the lower annular end surface of the auxiliary piston with the upper annular end surface of the adapter 62.

The adapter 62 has an upper end portion 111 of reduced external diameter provided with a lateral aperture or bore 112 which facilitates flow of fluids between the annular flow passage 114 between the operator rod and the adapter above the packing gland 70 and the annular passage or chamber 115 between the adapter 62 and the housing above the O-ring 69 when the auxiliary piston is in the lower position illustrated in FIGURE 3.

The longitudinal flow passage 57 of the operator rod 54 extends through the bottom rod section 53, the piston 80 and the lower portion of the intermediate rod section 81 and opens into the annular piston chamber 117 in the body above the piston 80 through lateral port 118 of the intermediate section. The upper end of the piston chamber 117 is closed by the packing assembly 120 which seals between the intermediate rod section and the housing. The seal assembly is received in an upwardly opening internal recess 121 of the internal annular flange 122 of the housing. The lower end of the recess is defined by the upwardly facing annular shoulder 123 which limits downward movement of the seal assembly 120 relative to the housing. Upward movement of the seal assembly 120, which may be of the Chevron type and which seals against flow in either direction between the operator rod and the housing, is limited by the lower annular end surface of the seal ring 125 disposed about the intermediate rod section. The seal ring is held against upward movement relative to the housing by the engagement of the upwardly facing annular shoulder 126 of an external annular flange thereof with the downwardly facing annular stop shoulder of the tubular housing extension 129 threaded into the upper end portion of the housing above the internal flange 122 thereof. The seal ring is provided with an internal annular recess in which is disposed an O-ring 130 which seals between the ring and the intermediate rod section 81 and also has an external annular recess in which is disposed an O-ring 132 which seals between the seal ring and the housing extension 129.

The housing extension has a cap 135 threaded on the upper end thereof whose inwardly extending annular flange 136 engages the upper annular end surface of a seal ring 137 telescoped in the upper end of the housing extension to prevent its upward displacement from the housing extension. Downward movement of the seal ring is limited by the engagement of the downwardly facing annular stop shoulder 138 of the ring provided by an external annular flange thereof but with the upwardly facing annular stop shoulder 139 of the housing extension provided by an upwardly opening recess of the housing extension. The ring 137 has an internal annular recess in which is disposed an O-ring 140 which seals between the seal ring and the top rod section 83 and with an external annular recess in which is disposed an O-ring 142 which seals between the housing extension and the seal ring.

It will be noted that the operator rod and the housing extension provide an annular chamber 145 between the two seal rings 125 and 137. A port ring 150 located in the annular chamber is mounted on the intermediate rod section 81 for limited longitudinal movement thereon, downward movement of the port ring being limited by the engagement of its lower annular end surface with the annular upwardly facing stop shoulder 152 of the intermediate rod section and its upward movement being limited by the engagement of its upper annular end surface with the downwardly facing annular end surface 154 of the top rod section. The port ring has a port 155 of restricted orifice whose upper end is closed by the engagement of the top annular surface of the port ring with the downwardly facing annular surface 154 of the top rod section when the port ring is in an upper position on the operator rod. The outer peripheral surface of the port ring slidably engages the internal surface of the housing extension. Since no sealing means are provided between the port ring and the housing extension, fluid may leak slowly between the port ring and the housing extension during longitudinal movement of the operator rod in the housing. When the operator rod is moving from the lower position illustrated in FIGURE 3 to the upper position illustrated in FIGURE 2, the fluid in the annular chamber 145 above the port ring 150 may flow to the portion of the annular chamber below the port ring not only between the peripheral surface of the port ring and the internal surface of the housing extension but also through the port of the port ring since the port ring will now be in the lower position illustrated in FIGURE 3 relative to the operator rod with its top annular surface spaced from the bottom annular surface of the top rod section being held in this position not only by gravity but also by any pressure differential across the port ring. During downward movement of the operator rod from its upper position illustrated in FIGURE 2 to its lower position in FIGURE 3, however, the port ring will tend to remain stationary as the operator rod moves quickly downwardly due to its inertia and also to the pressure differential which will be created thereacross as the operator rod moves downwardly since the flow of fluid therepast is restricted by the port ring. When the operator rod moves downwardly relative to the port ring to the position wherein the downwardly facing annular shoulder 154 of the top rod section engages the upper surface of the port ring, the port 155 is closed at its upper end and substantially all fluid flow must now take place between the peripheral surface of the port ring and the internal surface of the housing extension. This restriction of the flow of fluids past the port ring slows down the downward movement of the operator rod and serves to minimize or cushion shocks which would otherwise be imparted to the valve and the operator device 18. The port ring, however, since the orifice or port 155 thereof is open when the operator rod is moving upwardly, does not unduly restrict or hinder upward movement of the operator rod in the housing.

A handle 160 is threaded on the upper end portion of the top rod section so that the operator rod, and therefore the valve gate 41, may be moved upwardly to open the valve by screwing the handle on the top rod section after the spacer 162 has been disposed between the handle and the cap 135 as illustrated in FIGURES 4 and 5. The spacer 162 has a longitudinal slot 163 so that it may be easily inserted between the cap and the handle with the top rod section and the retainer screw 164 received therein. The retainer screw is threaded in a suitable bore of the internal flange 136 of the cap 135. The retainer screw 164 prevents rotational movement of the spacer during rotation of the handle. The spacer may be secured against accidental loss by a chain 165 or other suitable flexible member one of whose ends may be secured to the cap by the retainer screw 164 and whose other end may be secured to the spacer by the retainer screw 166 threaded in a suitable lateral bore of the spacer.

The lateral threaded aperture or bore 170 of the housing communicates with the piston chamber 117 above the piston 80 of the operator rod into which is screwed the threaded reduced end portion 171 of a valve housing 172. The valve housing has a flow passage 173 which communicates with the piston chamber and which is closable by the ball valve 175 disposed in the annular valve seat member 176. The annular valve seat 177 of the seat member is engageable by the ball valve when the ball valve moves outwardly relative to the operator housing. Inward movement of the ball valve is limited by its engagement with the annular stop shoulder 178 of the valve housing. The ball valve permits flow of fluid from the piston chamber when it is moved out of engagement with the seat 177 but prevents such flow of fluid from the piston chamber when in seating engagement with the seat 177. The valve seat member 176 is held against displacement in the valve housing by an annular retainer ring 180 threaded in an enlarged portion of the bore of the valve housing. Inward movement of the valve seat member is limited by its engagement with the annular shoulder 178 of the valve housing and an O-ring 179 or other suitable seal means seals between the valve seat member and the valve housing.

The valve housing 172 has a lateral port 182 which communicates with the internal flow passage 173 of the valve housing and with the flow passage of a conduit 184 whose upper end is secured to the dependent extension 186 of the valve housing by any suitable coupling or fitting assembly 188 having a member threaded in the bore 188 of the dependent extension and whose lower end is connected to the operator device housing 60 by a similar fitting assembly 190 having a member threaded in the lateral bore 192 of the operator housing which opens into the annular chamber 115 between the adapter and the housing below the auxiliary piston.

The pilot valve 19 for moving the ball valve 175 to open position and for controlling the flow of fluids through the conduit 184 includes a tubular body 200 whose reduced end portion 201 is threaded in the valve housing 172. A valve member 204 is mounted in the pilot valve body for limited longitudinal movement therein between the position illustrated in FIGURE 2 wherein the forward reduced portion 205 of the valve member extends through the retainer ring 180 and the annular valve seat member 176 and holds the ball valve 175 out of engagement with the valve seat 177 and the retracted position illustrated in FIGURES 3 and 6 wherein the reduced end portion of the valve member is out of engagement with the ball valve 175 so that the ball valve may be moved by the pressure within the piston chamber 117 to closed position in sealing engagement with the valve seat 177. The valve member is biased toward its retracted position within the body 200 by a spring 207 one of whose ends bears against the annular shoulder 208 provided by the external annular end flange 209 of the valve member and whose other end bears against the end surface or shoulder 210 of a retainer 211 threaded in the end portion 201 of the body. The retainer is provided with an internal annular recess in which is disposed an O-ring 213 which seals between the retainer and the valve member 204. Movement of the valve member toward retracted position from its extended ball valve opening position is limited by the engagement of the flange 209 with the annular stop shoulder 214 of the pilot valve body.

The valve member 204 has a longitudinal flow passage 215 and a lateral port 216 which communicates the inner end of the longitudinal flow pasage with the bore or flow passage of the valve housing 172 outwardly of the valve seat member 176 so that the inner end of the flow passage of the valve member is always in communication with the lateral port 182 of the valve housing. The valve member has a seat surface 218 whereby the outer end of the flow passage 215 thereof may be closed by the engagement therewith of the seat surface 219 of the piston 220 of the pilot valve when it is moved to the position illustrated in FIGURE 2 by fluid pressure from the control conduit 20 admitted into the chamber 221 of the cylinder cap 222 through a suitable coupling or fitting assembly 223 having a member threaded in the bore 224 of the cylinder cap. An annular piston member 226 is threaded on the piston rod 227 of the piston 220 and is locked in place by a suitable nut 228. The piston member has an external annular recess in which is disposed an O-ring 230 which seals between the internal surface 232 of the cylinder cap and the piston member. The cylinder cap is threaded on the external annular end flange 234 of the pilot valve body 200. An O-ring 235 is disposed in a suitable external annular recess of the end flange and seals between the cylinder cap and the end flange.

The piston 220 is biased towards its retracted position, illustrated in FIGURES 3 and 6, by a spring 240 disposed about the piston rod or stem 227, one of whose ends bears against the annular stop shoulder 241 of the pilot valve body and the other of whose ends bears against the annular stop shoulder 242 of the piston member. An O-ring 244 disposed in a suitable annular external recess of the piston rod 227 seals between the valve body 200 and the piston rod between the exhaust port 245 of the valve body and the annular stop shoulder 241 thereof. The vent port 247 of the valve body communicates with the interior of the valve body and of the cylinder cap to permit entry into and escape of air from the piston chamber 221 to the right of the piston member as the piston member 226 moves to the left to its retracted position and to the right to its extended position, respectively.

The seal ring 244 is provided in order that a relatively small area of the piston rod be exposed to the pressure of the fluid which may flow through the flow passage 173 from the piston chamber 117 of the operator housing 60 into the exhaust port 245 since if the pressure of the fluids is extremely high, a relatively great pressure could be present in the passage 173 downstream of the ball valve and of the valve member 204 even though the exhaust port 245 is open and if such pressure were also exerted on the cross-sectional area of the piston defined by the line of sealing engagement of the O-ring 230 with the internal cylindrical surface 232 of the cylinder cap 222, a relatively great pressure would have to be introduced into the piston chamber to the left of the piston member from the control conduit 20 to move the piston to the position illustrated in FIGURE 2.

In use, when the main valve operator device 18 is employed with the pilot valve 19 and the automatic control valve 26 in a pressure responsive system, such as the system 10 illustrated in FIGURE 1, to control the flow of well fluids from a well 12 through the flow conductor or pipeline 11 to a point of storage, such as the tank 13, the automatic control valve 26 is adjusted to permit bleeding or exhaust of the fluid pressure from within the control conduit 20 through the conduit 27 and the exhaust duct or outlet 29 of the automatic control valve whenever the pressure in the flow conductor 11 downstream of the main valve either rises above a predetermined high value or drops below a predetermined low value.

Assuming now that the pressure in the flow conductor 11 downstream of the main or safety valve 15 is within the predetermined or normal range, the automatic control valve 26 is now in position preventing exhaust of fluid from the control conduit 20 and the pressure within the control conduit 20 is at a predetermined high value which is determined by the pressure regulator 22. Since the control conduit 20 communicates with the piston chamber 221 of the pilot valve 19, the fluid pressure from the conduit 20 holds the piston 220 of the pilot valve in the extended position illustrated in FIGURE 2.

The engagement of the seat surfaces 218 and 219 of the valve member 204 and the piston 220 of the pilot valve holds the flow passage 215 of the valve member closed so that fluid may not flow through the passage 215 to be exhausted through the exhaust port 245 of the pilot valve body 200. The engagement of the piston rod with the valve member also holds the valve member in the extended position illustrated in FIGURE 2 wherein the reduced end portion 205 of the valve member engages and holds the ball valve 175 out of engagement with the seat 177 of the valve seat member 176 so that the flow passage 173 is in communication with the lateral port 182 and so that the upper end of the piston chamber 117 above the main piston 80 is in communication with the annular passage or chamber 114 below the auxiliary piston 100 and the main piston through the flow passage 173 of the valve housing 172, the valve seat member 176, the retainer ring 180 the lateral port 182 of the valve housing 172, the annular extension 186 thereof and the connector conduit 184. As a result, the fluid pressure from the longitudinal flow passage of the main valve body 30 communicated to the piston chamber 117 above the main piston 80 through the flow passage 56 of the gate valve 41 and the flow passage 57 and the lateral port 118 of the operator rod is now applied to opposite sides of the main piston 80 and acts on the oppositely facing equal areas of the piston disposed between the line of sealing engagement of the O-ring 86 of the main piston 80 with the bottom rod section 53 and the line of sealing engagement of the seal assembly 89 with the sealing surface 90 of the housing 60. The forces exerted on the piston by the fluid pressure are thus balanced and the fluid pressure from the longitudinal passage 31 therefore does not tend to move the operator rod in either direction. This fluid pressure is applied, however, across the area of the operator rod defined by the line of sealing engagement of the seal assembly 120 with the rod section 81 so that the force exerted by the fluid pressure across this area of the operator rod holds the operator rod in the raised position since this pressure is much greater than the atmospheric pressure acting on substantially the same area of the top rod section 83 defined by the line of sealing engagement of the O-ring 140 with the top rod section.

Should the pressure in the flow conductor 11 downstream of the main valve 15 either rise above the predetermined high value at which the automatic control valve 26 operates to exhaust the fluid from the control conduit 20, as for example, if the control valve 16 is closed, or if the pressure within the flow conduit 11 drops below the predetermined low value at which the automatic control valve 26 operates to exhaust the fluid from the control conduit, as for example, due to the breakage of the flow conductor 11, the automatic control valve will exhaust the fluid from the control conduit to the atmosphere. The pressure within the control conduit 20 will therefore drop below the value necessary to keep the piston 220 of the pilot valve 19 in the extended position illustrated in FIGURE 2 and the piston 220 is moved to its retracted position, illustrated in FIGURE 3, by the force exerted by its biasing spring 40. As the pilot valve piston 220 moves towards its retracted position, the valve member 204 of the pilot valve also moves towards its retracted position due to the force exerted by its biasing spring 207 until its movement is stopped by the engagement of its flange 209 with the stop shoulder 214 of the pilot valve body 200. At this time continued movement of the pilot valve piston toward its retracted position causes the seat surface 219 of the piston rod 227 to move out of engagement with the seat surface 218 of the valve member and the flow passage 215 of the valve member is placed in communication with the atmosphere through the exhaust port 245. The pressure differential thus created across the ball valve, since the pressure in the piston chamber 117 is much greater than atmospheric pressure, now moves the ball valve into engagement with the seat 177 of the seat member 176 since the valve member 204 no longer holds the ball valve off the seat 177. The annular chamber 114 is simultaneously placed in communication with the atmosphere through the connector conduit 184, the lateral port 182 of the valve housing 172, the flow passage 173 of the valve housing to the left of the retainer ring 180, the lateral port 216 and the flow passage 215 of the valve member 204, and the exhaust port 245 of the pilot valve body. The fluid pressure from within the longitudinal flow passage 31 of the main body now acting on the upwardly facing surface area of the main piston is effective to move the operator rod downwardly in the operator device housing 60.

The very high pressures within the longitudinal flow passage of the main valve would tend to move the operator rod, and therefore the valve gate, at a great velocity to its lowermost position once the valve member 204 moves to its retracted position. The fluid trapped in the annular chamber 145 below and by the port ring, however, slows down such downward movement of the operator rod since the port 155 of the port ring is closed upon the commencement of the downward movement of the operator rod due to the engagement of the downwardly facing annular end surface 154 of the top rod section with the upwardly facing top surface of the port ring and the effective orifice between the outer peripheral surface of the port ring and the internal surface of the housing extension 129 is very small and fluid can leak therepast only quite slowly. The shock reducing assembly comprising the port ring thus slows the downward movement of the operator rod and also cushions or absorbs the shock which would otherwise be imparted to the valve gate and to the operator device by a very sudden movement of the operator rod and the valve gate to their lower positions.

As the operator rod moves downwardly in the valve housing, the lower end portion of the main piston 80 moves downwardly into the upwardly opening annular recess 98 of the auxiliary or floating piston 100 until the lower annular end surface of the port ring engages the upwardly facing annular shoulder 101 of the auxiliary piston. Further downward movement of the operator rod now causes downward movement of the auxiliary piston with the operator rod until further downward movement of the operator rod is stopped by the engagement of the lower annular end surface of the auxiliary piston with the upwardly facing top end surface of the adapter 62. Fluid from the longitudinal flow passage 31 of the valve body upstream of the valve gate 42 may continue to flow upwardly through the flow passages 56 and 57 of the valve gate and the operator rod even when the flow passage 42 of the valve gate is moved downwardly and out of alignment with the longitudinal flow passage of the valve body since no sealing means are provided between the upstream side surfaces 46 and 47 of the valve gate and the valve body, respectively. As a result the fluid pressure from upstream of the main valve is effective to move the valve gate to its fully closed position, illustrated in FIGURE 3, and to hold it in fully closed position as long as the ball valve 175 is in sealing engagement with the seat 177 of the valve seat member.

Fluid may also flow between the upstream surfaces 46 and 47 of the valve gate and the valve body into the chamber 40 above the valve gate and below the packing gland as the valve gate moves downwardly to its closed position. When the valve gate moves to its lower position illustrated in FIGURE 3, the O-ring 44 seals between the downstream surfaces 43 and 45 of the valve body and the valve gate, respectively, and the pressure differential now created across the valve gate tends to move the valve gate to the right, as seen in FIGURE 3, and hold it in tight sealing engagement with the O-ring 46 and in frictional engagement with the downstream side surface 43 of the valve body.

As the floating or auxiliary piston is moved downwardly, an annular chamber 250 is formed between the main piston and the internal seal surface 108 of the housing below the downwardly facing annular stop shoulder 109. The pressure within this chamber 250, of course, decreases as the auxiliary piston moves downwardly since no fluid may flow thereinto. The extremely high pressure from the upstream side of the main valve is so great that any partial vacuum condition which may be created in such chamber 250 is easily overcome by the force exerted on the main piston by the upstream pressure. The fluids from the well flowing through the flow conductor 11 are gaseous or are a mixture of gas and liquid and the pressure within the chamber 250 is normally above atmospheric pressure immediately upon completion of the downward movement of the operator rod since such gases trapped above the seal assembly 106 and the O-ring 103 and below the seal assembly 89 of the main piston at the time of sealing engagement of the O-ring 103 with the seat ring 104 are at a pressure higher than atmospheric pressure because of the restricted orifice of the flow passage through which the fluid in the annular chamber 115 is exhausted to the atmosphere. The restricted orifice of this flow passage, i.e., the connector conduit 184, the lateral port 182, the flow passage 215 and the exhaust port 245, does not permit the pressure in the annular chamber to fall to atmospheric pressure in the short period of time between the opening of the flow passage 215 and the movement of the seat ring 104 into sealing engagement with the O-ring 103. The fluid trapped in the chamber 250 may leak past the seal assembly 106 of the floating piston, since the seal assembly permits downward flow of fluids therepast, until the pressure in the chamber 250 drops to atmospheric pressure. This drop to atmospheric pressure is achieved some time after the floating piston has been moved to its lowermost position.

It will be noted that a relatively small force exerted on the operator rod is effective to move the valve gate from its open position toward its closed position since the pressure differential across the valve gate is small as long as the flow passage 47 of the valve gate is in communication with the longitudinal flow passage 31 of the valve body. The operator rod and the valve gate therefore attain a velocity and a momentum, even when the movement of the operator rod is slowed by the action of the port ring, which moves the valve gate to its fully closed position even though the pressure differential across the valve gate increases as its flow passage moves out of alignment and out of communication with the flow passage of the valve body. The force of the upstream fluid pressure is thus effective to move the valve gate to its closed position even though it is exerted only on the relatively small upwardly facing area of the main piston.

If the operation of the automatic control valve is due to the closure of the control valve 16, the pressure regulator 22 will open to permit fluid to flow from the flow conductor 11 into the control conduit 20 since the pressure within the control conduit will now, of course, drop below the value at which the pressure regulator opens. Since the flow into the control conduit is through the choke 21 of restricted orifice, the pressure within the control conduit 20 cannot increase to the value necessary to operate the piston 220 of the pilot valve until the automatic control valve 26 closes the outlet 29.

If the control valve 16 is now opened and if the pressure within the flow conductor 11 downstream of the main valve 15 is above the predetermined low value, the automatic control valve will operate to close its outlet 29 and thus stop bleeding or exhaust of the fluid from the control conduit 20. The pressure in the control conduit 20 will now rise to the value at which it is effective to move the piston 220 of the pilot valve from its retracted position to its extended position illustrated in FIGURE 2. During this movement of the pilot valve piston 220, the seat 219 of its rod 227 engages the seat 218 of the valve member 204, closes the flow passage 215 and then moves the valve member to its extended position wherein it moves the ball valve out of engagement with its seat 177. The well fluids then flow between the upstream side surfaces 46 and 47 of the valve gate and the valve body, through the flow passage 56 of the valve gate and the flow passage 57 and the lateral port 118 of the operator rod into the piston chamber 117 above the main piston and from the upper end of the piston chamber 117 to the annular chamber 115 below the main piston through the flow passage 173 of the valve housing 172, the seat member 177, the retainer ring 180, the lateral port 182 of the valve housing and the connector conduit 184. The pressure of the well fluids is also communicated to the annular chamber 114 through the port 112 of the adapter.

Once the ball valve 175 moves to its open position, the pressure of the upstream fluid acting across the area of the operator rod defined by the line of sealing engagement of the seal assembly 120 with the intermediate rod section exerts an upward force tending to move the operator rod and therefore the valve gate upwardly. The force of the upstream fluid pressure exerted across this area of the operator stem, however, is not great enough to overcome the frictional forces tending to hold the valve gate against movement created by the great pressure differential across the valve gate which holds the downstream side surface 45 of the valve gate in frictional engagement with the downstream side surface 43 of the main valve.

The force of the fluid pressure in the longitudinal flow passage 31 of the valve body upstream of the valve gate once the ball valve 175 moves to its open position also acts on the whole downwardly facing area of the main piston and the auxiliary piston within the line of sealing engagement of the seal assembly 100 with the sealing surface 108 below the stop shoulder 109. The force exerted on the downwardly facing area is only partially balanced by the force exerted by the upstream pressure on the upwardly facing area of the main piston. The force of the pressure exerted across the large combined area of the operator rod and the main and auxiliary pistons is therefore great enough to overcome the great resistance offered by the frictional engagement of the valve gate with the side surface 43 and to move the operator rod and the valve gate upwardly. During such upward movement of the auxiliary piston and the operator rod, any fluid trapped in the chamber 250, which now is at atmospheric pressure is merely compressed since the upstream pressure is of course many times greater than atmospheric pressure.

The port ring does not slow down or hinder upward movement of the operator rod since its port 155 is not closed during upward movement of the operator rod and the fluid in the annular chamber 145 may flow through the port of the port ring as well as between the peripheral surface of the ring and the internal surfaces of the housing extension 129.

Upward movement of the operator rod now moves the valve gate upwardly and the pressure differential across the valve gate decreases rapidly as soon as the upper portions of the flow passage 42 of the valve gate move upwardly past the lower portions of the O-ring 44 and fluid flow is established through the flow passage 42 between the upstream and downstream portions of the longitudinal flow passage of the valve body. The frictional force tending to resist upward movement of the valve gate to its open position decreases greatly as soon as this communication is established and further upward movement of the operator rod and the valve rod may now be effected by the force of the fluid pressure in the longitudinal flow passage of the valve body exerted only across the area of the operator rod defined by the line of sealing engagement of the seal assembly 120 with the intermediate rod section 81. Upward movement of the operator rod and the valve gate to the positions illustrated in FIGURE 2 will therefore continue after upward movement of the auxiliary piston is stopped by the engagement of its upper end surface with the downwardly facing stop shoulder 109 of the operator housing which occurs immediately upon the communication of the flow passage of the valve gate with the flow passage of the valve body. It will thus be apparent that the auxiliary piston is employed only to help overcome the initially great forces tending to hold the valve gate against movement which are due to the great pressure differential existing across the valve gate when the valve gate is in its lower closed position and that continued upward movement of the valve gate to fully open position is accomplished by the much smaller force of the upstream fluid pressure exerted over the relatively small area of the piston rod. As a result, no undue velocity is imparted to the valve gate and the operator rod during their upward movement to open position which would be the case if the upstream fluid pressure were exerted over the full continued area of the piston rod, the main piston and the auxiliary piston throughout the full upward movement thereof. The provision of a floating piston which moves only through a limited distance with the main piston in either direction also permits the housing to be of relatively short length.

If the flow conductor is connected to a tank, such as the tank 13, the pressure of the fluids flowing through the flow conductor will ordinarily remain within the range between the high value and the low value at which the automatic valve functions. Should the control valve 16 be closed to shut off flow through the flow conductor, the pressure within the flow conductor between the control valve 16 and the main valve 15 will build up due to the continued flow of fluids through the main valve 15 until the increased pressure in the flow conductor actuates the automatic control valve 26 and causes the main valve 15 to close. Thus, the conduit 11 will contain fluids under a sufficiently high pressure to permit actuation of the main valve when the control valve 16 is again opened to permit the pressure of the fluids within the flow conductor 11 to drop below the predetermined higher pressure value at which the main valve will reopen.

If, however, the flow conductor leaks or breaks or the valve or tank leaks to such an extent that the pressure of the fluids in the flow conductor between the main valve and the control valve 16 drops below the predetermined low value at which the automatic control valve permits exhaust of fluid pressure from the control circuit, such exhausting of the fluid pressure from the control circuit will cause the main valve 15 to close. If the break or leak in the flow conductor is downstream from the control valve 16 and the control valve 16 is closed after the main valve has automatically closed, the pressure of the fluid in the flow conductor between the main valve and the control valve may be below the predetermined low value at which the automatic control valve prevents exhaust of fluid pressure from the control circuit, and opening of the control valve 16 will not cause automatic opening of the main valve 15. In this case, it may be necessary to repressure the flow conductor 11 downstream of the main valve to a pressure above such predetermined low pressure, which may be done at a location remote from the main valve, whereupon the automatic control valve will operate to prevent exhaust of the fluid from the control conduit.

Should no source of pressure be available for such repressuring or should such repressuring not be desirable, the main valve may be opened manually by inserting the spacer 162 between the cap 135 and the handle 160 whereupon the operator rod will be moved upwardly when the handle is rotated to raise the operator rod and to move the valve gate to open position. Once fluid communication is established in the flow conductor upstream and downstream of the main valve, the automatic control valve will again prevent bleeding or exhaust of fluid from the control conduit and the pressure in the control conduit will again rise, due to the flow of fluids through the pressure regulator and the choke, until the pressure within the control conduit attains the preset value and the pilot valve again is operated to cause the operator device to hold the main valve in open position. The spacer may then be removed and the valve will operate automatically in the manner described. In the event that the valve has been closed because of an abnormally low pressure within the flow conductor 11 downstream of the main valve 15 due to a breakage in the flow conductor, the flow conductor must be repaired and repressured before the pressure responsive control system may again operate to control operation of the main valve.

It will now be apparent that while the main valve 15 has been schematically shown as a valve having a simple single piece valve gate, the main valve may be of any suitable type and complexity having an operative element or elements operable by reciprocable movement imparted thereto by the operator rod or stem 54 of the operator device 18.

It will now be seen that a new and improved pressure responsive system 10 for automatically controlling flow of fluid through a flow conductor has been illustrated and described which includes a pressure sensing means, such as the automatic control valve 26, which functions when the pressure to which it is responsive, as in the flow conductor 11 downstream of the main or safety valve 15, exceeds or falls below a predetermined normal range of pressure to cause operation of a valve operator device or means to close a main valve controlling flow of fluids through such flow conductor and which causes the main valve operating means or device to open such main valve when the pressure in such flow conductor downstream of the main valve 15 returns within such normal range of pressure.

It will further be seen that the pressure responsive system may be controlled at a location remote from the main valve by suitable means, such as the control valve 16, which may be connected in the flow conductor to control the pressure within the flow conductor downstream of the main valve.

It will further be seen that the pressure control system includes an operator device 18 which is operable to close and open the main valve and whose motive power is provided by the fluid whose flow through the flow conductor is controlled by the main valve.

It will also be seen that the operator device 18 includes an operator stem or rod 54 for moving the operative element of the main valve, such as the valve gate 41, between its open and closed positions, the operator rod being reciprocable in a housing and having piston means exposable to the pressure of the fluid whose flow is controlled by the valve, and a control means which permits selective application of the fluid pressure to opposed end surfaces of the piston means to cause longitudinal movement of the operator rod in opposite directions.

It will further be seen that the area of one of the opposed end surfaces of the piston means is increased by the provision of an auxiliary or floating piston in order that the fluid pressure upstream of the valve exert a great force tending to move the operator rod in the direction which causes opening of the valve until flow is established through the valve since a great force is necessary to move the valve to its open position due to the pressure differential established across the operative element of the main valve when the valve is in closed position.

It will further be seen that the means for selectively applying fluid pressure to the opposed surfaces of the piston means includes a bypass means connecting the bore of the housing on opposite ends of the piston means of the operator rod which includes the connector conductor 184 and the valve housing 172, and the ball valve 175 for preventing flow of fluids from the bore of the operator device housing on one end of the piston means and to the bore on the opposite end of the piston means which has the increased area through the bypass flow passage, the operator rod having a flow passage continuously in communication with the upstream side of the longitudinal flow passage of the valve which communicates with the bore of the operator housing on the one end of the piston means having the small area.

It will further be seen that a control means, such as the pilot valve 19, is provided for moving the ball valve 175 to open position to permit flow of the pressure fluid from the bore on one end of the piston means to the bore on the other end of the piston means to cause the piston means to move the operator rod in one direction in the housing to open the main valve and that the control means permits the ball valve 175 to move to closed position to prevent flow of fluid from the bore on the one end of the piston means and at the same time permits exhaust of fluid from the bore of the valve housing on the other end of the piston means to cause movement of the piston rod in the opposite direction to close the main valve.

It will further be seen that the pilot control means 19 is operable by fluid pressure in a conduit control 20 to move the ball valve to open position to prevent exhaust of fluid from the bore of the operator housing on the end of the piston means having the increased area whereby the fluid pressure from upstream of the main valve communicated to the bore of the operator device housing on the end of the piston means of increased area may move the operator rod to its upper position and thus move the operative elements or gate of the valve to open position.

It will further be seen that a means, such as the pressure regulator 22 and choke 21, is provided for supplying fluid under pressure to the control conduit and that a means responsive to the pressure of the fluid in a flow conductor in which the main valve is located, such as the automatic control valve 26, is connected to the control conduit to exhaust the fluid from the control conduit whenever the pressure within the flow conductor either rises above or drops below a predetermined range of values to permit movement of the pilot control means to its position permitting the ball valve 175 to move to closed position and permitting the bore of the housing on the end of the piston means of increased area to exhaust to the atmosphere.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An operator device for moving an operative means of a valve between open and closed positions comprising: a housing having means for connection to a valve and provided with a longitudinal bore; an operator rod extending through said bore of said housing and longitudinally movable therein, said operator rod having means at one end connectable to operative means of a valve, said operator rod having piston means sealingly engageable with said housing and dividing said bore into a first chamber on one end of said piston means and a second chamber on the other end of said piston means; means providing a bypass flow passage communicating with said chambers on opposite ends of said piston means, said operator device having means for admitting motive fluid pressure to said first chamber; means associated with said bypass flow passage to effect a reduction of fluid pressure in said second chamber relative to said first chamber, said bore of the housing having one longitudinal portion of reduced diameter and a second longitudinal portion of enlarged diameter, said piston means including a main piston movable in longitudinal portion of reduced diameter and an auxiliary piston movable in said portion of enlarged diameter of said bore; coengageable means on said pistons limiting movement of said main piston relative to said auxiliary piston upon movement of said operator rod and main piston from one extreme longitudinal portion in said housing a predetermined distance in one direction in said housing, the operator rod being adapted to hold operative means of a valve in open position when in said one extreme position and being adapted to move operative means of a valve from open toward closed position during movement thereof in said one direction, said housing and said auxiliary piston having coengageable means limiting movement of said auxiliary piston in said bore in a second direction opposite to said one direction upon movement of said auxiliary piston and said operator rod a predetermined distance from a second extreme position of the operator rod wherein the operator rod is adapted to hold the operative means of a valve in closed position; and means sealing between said pistons when said main piston is engaged with said auxiliary piston, said auxiliary piston being of greater diameter than said main piston.

2. The operator device of claim 1 wherein said housing has means providing a third chamber, said operator rod extending in said one direction from said second chamber through said third chamber; means sealing between said operator rod and said means providing a third chamber on opposite ends of said third chamber; fluid flow restricting means carried by said operator rod in said chamber extending between said rod and said means providing said third chamber, said flow restricting means and said operator rod having means coengageable to increase the restriction of flow of fluid past said flow restricting means when said operator rod is moved in said one direction.

3. The operator device of claim 2 wherein said flow restricting means comprises a port ring mounted on said operator rod for limited longitudinal movement relative thereto, said port ring having a port extending longitudinally of said operator rod, said operator rod having means engageable with said port ring for closing said port upon movement of said operator rod in said one direction.

4. The operator device of claim 1, and means operatively associated with said means providing a bypass flow passage for simultaneously preventing flow from said first chamber and permitting flow from said second chamber and for permitting flow from said first chamber to said second chamber.

5. An operator device for moving an operative means of a valve between open and closed positions comprising: a housing having means for connection to a valve and provided with a longitudinal bore; an operator rod extending through said bore of said housing and longitudinally movable therein, said operator rod having means at one end connectable to operative means of a valve, said operator rod having piston means sealingly engageable with said housing and dividing said bore into a first chamber on one end of said piston means and a second chamber on the other end of said piston means; means providing a bypass flow passage communicating with said chambers on opposite ends of said piston means, said operator device having means for admitting motive fluid pressure to said first chamber; means associated with said bypass flow passage to effect a reduction of fluid pressure in said second chamber relative to said first chamber, said bore of the housing having one longitudinal portion of reduced diameter and a second longitudinal portion of enlarged diameter, said piston means including a main piston movable in said longitudinal portion of reduced diameter and an auxiliary piston movable in said portion of enlarged diameter of said bore; coengageable means on said pistons limiting movement of said main piston relative to said auxiliary piston upon movement of said operator rod and main piston from one extreme longitudinal portion in said housing a predetermined distance in one direction in said housing, the operator rod being adapted to hold operative means of a valve in open position when in said one extreme position and being adapted to move operative means of a valve from open toward closed position during movement thereof in said one direction, said housing and said auxiliary piston having coengageable means limiting movement of said auxiliary piston in said bore in a second direction opposite to said one direction upon movement of said auxiliary piston and said operator rod a predetermined distance from a second extreme position of the operator rod wherein the operator rod is adapted to hold the operative means of a valve in closed position, said operator rod having a section of smaller external diameter than said main piston extending from said first chamber through said housing in said second direction; means sealing between said section and said housing and between said first chamber and the exterior of said housing; and means sealing between said pistons when said main piston is engaged with said auxiliary piston.

6. An operator device for moving an operative means of a valve between open and closed positions comprising: a housing having means for connection to a valve and provided with a longitudinal bore; an operator rod extending through said bore of said housing and longitudinally movable therein, said operator rod having means at one end connectable to operative means of a valve, said operator rod having piston means sealingly engageable with said housing and dividing said bore into a first chamber on one end of said piston means and a second chamber on the other end of said piston means; means providing a bypass flow passage communicating with said chambers on opposite ends of said piston means, said operator device having means for admitting motive fluid pressure to said first chamber; means associated with said bypass flow passage to effect a reduction of fluid pressure in said second chamber relative to said first chamber, said bore of the housing having one longitudinal portion of reduced diameter and a second longitudinal portion of enlarged diameter, said piston means including a main piston movable in longitudinal portion of reduced diameter and an auxiliary piston movable in said portion of enlarged diameter of said bore; coengageable means on said pistons limiting movement of said main piston relative to said auxiliary piston upon movement of said operator rod and main piston from one extreme longitudinal portion in said housing a predetermined distance in one direction in said housing, the operator rod being adapted to hold operative means of a valve in open position when in said one extreme position and being adapted to move operative means of a valve from open toward closed position during movement thereof in said one direction, said housing and said auxiliary piston having coengageable means limiting movement of said auxiliary piston in said bore in a second direction opposite to said one direction upon movement of said auxiliary piston and said operator rod a predetermined distance from a second extreme position of the operator rod wherein the operator rod is adapted to hold the operative means of a valve in closed position, said operator rod having a section of smaller external diameter than said main piston extending from said first chamber through said housing in said second direction; means sealing between said section and said housing and between said first chamber and the exterior of said housing; means sealing between said operator rod and said housing and between the exterior of said housing and said second chamber; and means sealing between said pistons when said main piston is engaged with said auxiliary piston.

7. An operator device for moving an operative means of a valve between open and closed positions comprising: a housing having means for connection to a valve and provided with a longitudinal bore; an operator rod extending through said bore of said housing and longitudinally movable therein, said operator rod having means at one end connectable to operative means of a valve, said operator rod having piston means sealingly engageable with said housing and dividing said bore into a first chamber on one end of said piston means and a second chamber on the other end of said piston means; means providing a bypass flow passage communicating with said chambers on opposite ends of said piston means, said operator device having means for admitting motive fluid pressure to said first chamber; means associated with said bypass flow passage to effect a reduction of fluid pressure in said second chamber relative to said first chamber, said bore of the housing having one longitudinal portion of reduced diameter and a second longitudinal portion of enlarged diameter, said piston means including a main piston movable in said longitudinal portion of reduced diameter and an auxiliary piston movable in said portion of enlarged diameter of said bore; coengageable means on said pistons limiting movement of said main piston relative to said auxiliary piston upon movement of said operator rod and main piston from one extreme longitudinal portion in said housing a predetermined distance in one direction in said housing, the operator rod being adapted to hold operative means of a valve in open position when in said one extreme position and being adapted to move operative means of a valve from open toward closed position during movement thereof in said one direction, said housing and said auxiliary piston having coengageable means limiting movement of said auxiliary piston in said bore in a second direction opposite to said one direction upon movement of said auxiliary piston and said operator rod a predetermined distance from a second extreme position of the operator rod wherein the operator rod is adapted to hold the operative means of a valve in closed position, said operator rod having a section of smaller external diameter than said main piston extending from said first chamber through said housing in said second direction; means sealing between said section and said housing and between said first chamber and the exterior of said housing, one of said pistons having an end portion and the other of said piston having an end recess in which the end portion of said one of said pistons is receivable upon movement of said operator rod in said one direction; and means for sealing between said end portion of said one of said pistons and the other of said pistons when said end portion is in said recess.

8. An operator device for moving an operative means of a valve between open and closed positions comprising: a housing having means for connection to a valve and provided with a longitudinal bore; an operator rod extending through said bore of said housing and longitudinally movable therein, said operator rod having means at one end connectable to operative means of a valve, said operator rod having piston means sealingly engageable with said housing and dividing said bore into a first chamber on one end of said piston means and a second chamber on the other end of said piston means; means providing a bypass flow passage communicating with said chambers on opposite ends of said piston means; means associated with said bypass flow passage to effect a reduction of fluid pressure in said second chamber relative to said first chamber, said operator rod having a flow passage communicating with said first chamber and being adapted to communicate with the upstream side of the flow passage of a valve when said operator device is connected to a valve, said bore of the housing having one longitudinal portion of reduced diameter and a second longitudinal portion of enlarged diameter, said piston means including a main piston movable in said longitudinal portion of reduced diameter and an auxiliary piston movable in said portion of enlarged diameter of said bore; coengageable means on said pistons limiting movement of said main piston relative to said auxiliary piston upon movement of said operator rod and main piston from one extreme longitudinal portion in said housing a predetermined distance in one direction in said housing, the operator rod being adapted to hold operative means of a valve in open position when in said one extreme position and being adapted to move operative means of a valve from open toward closed position during movement thereof in said one direction, said housing and said auxiliary piston having coengageable means limiting movement of said auxiliary piston in said bore in a second direction opposite to said one direction upon movement of said auxiliary piston and said operator rod a predetermined distance from a second extreme position of the operator rod wherein the operator rod is adapted to hold the operative means of a valve in closed position; and means sealing between said pistons when said main piston is engaged with said auxiliary piston, said auxiliary piston being of greater diameter than said main piston.

9. The operator device of claim 8, and means operatively associated with said means providing a bypass flow passage for preventing flow of motive fluid from said first chamber and simultaneously permitting flow of fluid from said second chamber and for permitting flow of motive fluid from said first chamber to said second chamber.

10. An operator device for moving an operative means of a valve between open and closed positions comprising: a housing having means for connection to a valve and provided with a longitudinal bore; an operator rod extending through said bore of said housing and longitudinally movable therein, said operator rod having means at one end connectable to operative means of a valve, said operator rod having piston means sealingly engageable with said housing and dividing said bore into a first chamber on one end of said piston means and a second chamber on the other end of said piston means; means providing a bypass flow passage communicating with said chambers on opposite ends of said piston means; means associated with said bypass flow passage to effect a reduction of fluid pressure in said second chamber relative to said first chamber, said operator rod having a flow passage communicating with said first chamber and being adapted to communicate with the upstream side of the flow passage of a valve when said operator device is connected to a valve, said bore of the housing having one longitudinal portion of reduced diameter and a second longitudinal portion of enlarged diameter, said piston means including a main piston movable in said longitudinal portion of reduced diameter and an auxiliary piston movable in said portion of enlarged diameter of said bore; coengageable means on said pistons limiting movement of said main piston relative to said auxiliary piston upon movement of said operator rod and main piston from one extreme longitudinal portion in said housing a predetermined distance in one direction in said housing, the operator rod being adapted to hold operative means of a valve in open position when in said one extreme position and being adapted to move operative means of a valve from open toward closed position during movement thereof in said one direction, said housing and said auxiliary piston having coengageable means limiting movement of said auxiliary piston in said bore in a second direction opposite to said one direction upon movement of said auxiliary piston and said operator rod a predetermined distance from a second extreme position of the operator rod wherein the operator rod is adapted to hold the operative means of a valve in closed position, said operator rod having a section of smaller external diameter than said main piston extending from said first chamber through said housing in said second direction; means sealing between said section and said housing and between said first chamber and the exterior of said housing; and means sealing between said pistons when said main piston is engaged with said auxiliary piston.

11. An operator device for moving an operative means of a valve between open and closed positions comprising: a housing having means for connection to a valve and provided with a longitudinal bore; an operator rod extending through said bore of said housing and longitudinally movable therein, said operator rod having means at one end connectable to operative means of a valve, said operator rod having piston means sealingly engageable with said housing and dividing said bore into a first chamber on one end of said piston means and a second chamber on the other end of said piston means; means providing a bypass flow passage communicating with said chambers on opposite ends of said piston means; means associated with said bypass flow passage to effect a reduction of fluid pressure in said second chamber relative to said first chamber, said operator rod having a flow passage communicating with said first chamber and being adapted to communicate with the upstream side of the flow passage of a valve when said operator device is connected to a valve, said bore of the housing having one longitudinal portion of reduced diameter and a second longitudinal portion of enlarged diameter, said piston means including a main piston movable in said longitudinal portion of reduced diameter and an auxiliary piston movable in said portion of enlarged diameter of said bore; coengageable means on said pistons limiting movement of said main piston relative to said auxiliary piston upon movement of said operator rod and main piston from one extreme longitudinal portion in said housing a predetermined distance in one direction in said housing, the operator rod being adapted to hold operative means of a valve in open position when in said one extreme position and being adapted to move operative means of a valve from open toward closed position during movement thereof in said one direction, said housing and said auxiliary piston having coengageable means limiting movement of said auxiliary piston in said bore in a second direction opposite to said one direction upon movement of said auxiliary piston and said operator rod a predetermined distance from a second extreme position of the operator rod wherein the operator rod is adapted to hold the operative means of a valve in closed position, said operator rod having a section of smaller external diameter than said main piston extending from said first chamber through said housing in said second direction; means sealing between said section and said housing and between said first chamber and the exterior of said housing; means sealing between said operator rod and said housing and between the exterior of said housing and said second chamber; and means sealing between said pistons when said main piston is engaged with said auxiliary piston.

12. An operator device for moving an operative means of a valve between open and closed positions compris-ing: a housing having means for connection to a valve and provided with a longitudinal bore; an operator rod extending through said bore of said housing and longitudinally movable therein, said operator rod having means at one end connectable to operative means of a valve, said operator rod having piston means sealingly engageable with said housing and dividing said bore into a first chamber on one end of said piston means and a second chamber on the other end of said piston means; means providing a bypass flow passage communicating with said chambers on opposite ends of said piston means; means associated with said bypass flow passage to effect a reduction of fluid pressure in said second chamber relative to said first chamber, said operator rod having a flow passage communicating with said first chamber and being adapted to communicate with the upstream side of the flow passage of a valve when said operator device is connected to a valve, said bore of the housing having one longitudinal portion of reduced diameter and a second longitudinal portion of enlarged diameter, said piston means including a main piston movable in said longitudinal portion of reduced diameter and an auxiliary piston movable in said portion of enlarged diameter of said bore; coengageable means on said pistons limiting movement of said main piston relative to said auxiliary piston upon movement of said operator rod and main piston from one extreme longitudinal portion in said housing a predetermined distance in one direction in said housing, the operator rod being adapted to hold operative means of a valve in open position when in said one extreme position and being adapted to move operative means of a valve from open toward closed position during movement thereof in said one direction, said housing and said auxiliary piston having coengageable means limiting movement of said auxiliary piston in said bore in a second direction opposite to said one direction upon movement of said auxiliary piston and said operator rod a predetermined distance from a second extreme positions of the operator rod wherein the operator rod holds the operative means of a valve in closed position, said operator rod having a section of smaller external diameter than said main piston extending from said first chamber through said housing in said second direction; means sealing between said section and said housing and between said first chamber and the exterior of said housing; means sealing between said pistons when said main piston is engaged with said auxiliary piston; means sealing between said operator rod and said housing and between the exterior of said housing and said second chamber; and means sealing between said pistons when said main piston is engaged with said auxiliary piston.

13. An operator device for moving an operative means of a valve between open and closed positions comprising: a housing having means for connection to a valve and provided with a longitudinal bore; an operator rod extending through said bore of said housing and longitudinally movable therein, said operator rod having means at one end connectable to operative means of a valve, said operator rod having piston means sealingly engageable with said housing and dividing said bore into a first chamber on one end of said piston means and a second chamber on the other end of said piston means, said housing having longitudinally spaced ports opening to said first and second chambers; means associated with said ports to effect a reduction of fluid pressure in said second chamber relative to said first chamber, said operator device having means for admitting motive fluid pressure to said first chamber, said bore of said housing having one longitudinal portion of reduced diameter and a second longitudinal portion of enlarged diameter, said piston means including a main piston movable in said longitudinal portion of reduced diameter and an auxiliary piston movable in said portion of enlarged internal diameter of said bore; coengageable means on said pistons limiting movement of said main piston relative to said auxiliary piston upon movement of said operator rod and main piston from one extreme longitudinal position in said housing a predetermined distance in one direction in said housing, said operator rod being adapted to hold operative means of a valve in open position when in one extreme position and being adapted to move operative means of a valve from open position toward closed position during movement thereof in said one direction, said housing and said auxiliary piston having coengageable means limiting movement of said auxiliary piston in said bore in a second direction opposite to said one direction upon movement of said auxiliary piston and said operator rod a predetermined distance from a second extreme position of the operator rod wherein the operator rod is adapted to hold the operative means of a valve in closed position; and means sealing between said pistons when said main piston is engaged with said auxiliary piston, said auxiliary piston being of greater diameter than said main piston.

14. An operator device for moving an operative means of a valve between open and closed positions comprising: a housing having means for connection to a valve and provided with a longitudinal bore; an operator rod extending through said bore of said housing and longitudinally movable therein, said operator rod having means at one end connectable to operative means of a valve, said operator rod having piston means sealingly engageable with said housing and dividing said bore into a first chamber on one end of said piston means and a second chamber on the other end of said piston means, said housing having a pair of longitudinally spaced ports opening to said first and second chambers; means associated with said ports to effect a reduction of fluid pressure in said second chamber relative to said first chamber, said operator rod having a flow passage communicating with said first chamber and adapted to communicate with the upstream side of the flow passage of a valve when said operator device is connected to a valve, said bore of the housing having one longitudinal portion of reduced diameter and a second longitudinal portion of enlarged diameter, said piston means including a main piston movable in said longitudinal portion of reduced internal diameter and an auxiliary piston movable in said portion of enlarged portion of said bore, coengageable means on said pistons limiting movement of said main piston relative to said auxiliary piston upon movement of said operator rod and main piston from one extreme longitudinal position in said housing a predetermined distance in one direction in said housing, said operator rod being adapted to hold operative means of a valve in open position when in said one extreme position and being adapted to move operative means of a valve from open position toward closed position during movement thereof in said one direction, said housing and said auxiliary piston having coengageable means limiting movement of said auxiliary piston in said bore in a second direction opposite to said one direction upon movement of said auxiliary piston and said operator rod a predetermined distance from a second extreme position of the operator rod wherein the operator rod is adapted to hold operative means of a valve in closed position; and means sealing between said piston when said main piston is engaged with said auxiliary piston, said auxiliary piston being of greater diameter than said main piston.

References Cited by the Examiner
UNITED STATES PATENTS

| | | | |
|---|---|---|---|
| 2,693,819 | 11/1954 | Otis | 137—458 |
| 3,049,140 | 8/1962 | Thornhill et al. | 137—458 XR |
| 3,092,136 | 6/1963 | Willis | 137—458 |

MARTIN P. SCHWADRON, *Acting Primary Examiner.*

ISADOR WEIL, *Examiner.*